United States Patent [19]
McGovern et al.

[11] 3,884,937
[45] May 20, 1975

[54] ESTERS OF 1,4-BENZODIOXAN-2-CARBOXYLIC ACID AS ATTRACTANTS FOR THE EUROPEAN CHAFER

[75] Inventors: Terrence P. McGovern, Bowie; Morton Beroza, Silver Spring, both of Md.; Bart J. Fiori, Genova, N.Y.

[73] Assignee: The United States of America as represented by the Secretary of Agriculture, Washington, D.C.

[22] Filed: Aug. 1, 1973

[21] Appl. No.: 384,652

Related U.S. Application Data

[62] Division of Ser. No. 90,792, Nov. 18, 1970, Pat. No. 3,777,017.

[52] U.S. Cl............................... 260/340.3; 424/278
[51] Int. Cl............................................... C07d 15/18
[58] Field of Search................................... 260/340.3

[56] References Cited
OTHER PUBLICATIONS

Koo et al., "Journal American Chemical Society," Vol. 77, 1955, pp. 5373-5375.

Primary Examiner—Donald G. Daus
Assistant Examiner—James H. Turnipseed

[57] ABSTRACT

The propyl, isobutyl, butyl, isopentyl and pentyl 1,4-benzodioxan-2-carboxylates were found to be effective attractants for the European chafer.

1 Claim, No Drawings

ESTERS OF 1,4-BENZODIOXAN-2-CARBOXYLIC ACID AS ATTRACTANTS FOR THE EUROPEAN CHAFER

A non-exclusive, irrevocable, royalty-free license in the invention herein described, throughout the world for all purposes of the United States Government, with the power to grant sublicenses for such purposes, is hereby granted to the Government of the United States of America.

This is a division of application Ser. No. 90.792, filed Nov. 18, 1970, now U.S. Pat. No. 3,777,017.

The patent rights for the United States in any invention in the patent to be granted on this application are dedicated to the public.

This invention relates to certain esters of 1,4-benzodioxan-2-carboxylic acid as attractants for the European chafer.

The European chafer, Amphimallon majalis Razoumowsky, is a serious pest that damages and sometimes destroys meadows, pastures, lawns, turf, winter grains, and legumes. The larvae, or grubs, of this insect feed on roots of plants. Heavy infestations can cause serious crop damage. Attractants in traps are used to delineate the areas of infestation to show where insecticide should be applied. Attractants in traps are also used to indicate the best time to apply control measures in order to minimize damage caused by the insect.

Lures which have been used in previous European chafer survey programs were a 3:1 mixture by volume of Java citronella oil and eugenol (H. Tashiro and W. E. Fleming, Journal of Economic Entomology, volume 47, page 618, 1954), which was replaced by butyl sorbate, the lure presently being used (H. Tashiro, S. I. Gertler, Morton Beroza, and Nathan Green, Journal of Economic Entomology, volume 57, page 230, 1964). The chemicals of this invention are up to 2.9 times more attractive than the standard lure.

According to the present invention esters having the general formula

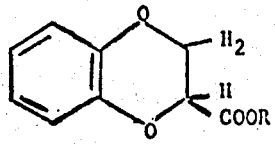

in which R is propyl, isobutyl, butyl, isopentyl, or pentyl are attractants for the European chafer beetle. Specifically, propyl 1,4-benzodioxan-2-carboxylate, isobutyl 1,4-benzodioxan-2-carboxylate, butyl 1,4-benzodioxan-2-carboxylate, isopentyl 1,4-benzodioxan-2-carboxylate, and pentyl 1,4-benxodioxan-2-carboxylate were found to be good to excellent attractants. Another advantage shown by the chemicals of this invention over the present standard, butyl sorbate is their low volatility. It is about one-fiftieth as volatile as butyl sorbate necessitating the use of much less chemical per trap.

Table 1 shows beetle catch and relative attractiveness data for seven 1,4-benzodioxan-2-carboxylic esters and butyl sorbate as well as carbon and hydrogen analysis data for six esters previously unreported in the literature.

The attractiveness for European chafer beetles of the esters of the present invention was demonstrated by practical field tests. In a typical test, about 20 ml. of the ester to be evaluated were placed in a standard 1-oz. bait bottle containing a ½-inch-diameter wick. Tests were conducted in a block of 100 (5 rows of 20 traps each) with black Japanese beetle bucket traps located 6.1 meters apart in an open field and held about 1.5 meters above the ground on metal rods. Traps were placed in a completely randomized design, and tests were begun when sufficient numbers of beetles were in the area. Each lure was replicated four times, and the total number of chafers captured each evening by each replicate was recorded for 5 consecutive nights. Traps were then re-randomized and chafer captures were determined for 4 additional nights. Traps containing butyl sorbate and traps with no bait were included as controls.

All of the esters of the present invention were synthesized for their use in these field tests. Ethyl 1,4-benzodioxan-2-carboxylate (not attractive or claimed) was synthesized in 70% yield by a method described in the literature (J. Koo, S. Avakian, and G. J. Martin, Journal of the American Chemical Society, volume 77, page 5373, 1955). The purity of the chemicals was determined by gas chromatographic analysis. The 1,4-benzodioxan-2-carboxylates of this invention were prepared by transesterifying the ethyl ester with the appropriate alcohol.

A typical procedure is illustrated by the following description of the preparation of propyl 1,4-benzodioxan-2-carboxylate: All glassware was oven-dried before use. A 500-ml. 2-neck, round-bottom flask equipped with a magnetic stirring bar, a dropping funnel, and a condenser fitted with a Dean-Stark water separator was charged with 75.7 gram of ethyl 1,4-benzodioxan-2-carboxylate and 125 ml. of anhydrous propyl alcohol. The reaction mixture was heated to 90°-100°C, and 0.6 gram of potassium dissolved in 25 ml. anhydrous propyl alcohol was added dropwise. The ethyl alcohol evolved (with some propyl alcohol because the boiling points of the two alcohols are close together) was collected as a distillate boiling at 85°-92°C. Additional propyl alcohol was added as the reaction proceeded, and its progress was followed by periodic gas chromatographic analysis. The reaction was terminated when the peak at the retention time of the ethyl ester disappeared (ca. 4 hrs). The cooled reaction mixture was taken up in ether and washed with water to neutrality. After drying over anhydrous magnesium sulfate, the ether was removed on a rotating evaporator, excess alcohol was removed by distillation under water pump vacuum, and the residue was distilled under high vacuum to give 67 gram of the desired product (83% yield).

The foregoing examples of attraction of European chafers by chemical lures are meant to be illustrative rather than limiting. For example, mixtures of the present invention with inert or other known chafer lures may be used without departing from the disclosure herein. The use of other formulations of these esters are also not considered to be departures from this invention. For example, it is well known in the art that insecticides may be mixed with the attractive chemical and dispensed for control or detection purposes.

Table 1. Relative attractancy to European chafer beetles of esters of 1,4-benzodioxan-2-carboxylic acid vs. the standard butyl sorbate.

| Ester | No. of chafers captures/4 replicates[a] | Relative attractiveness | Analysis Theory | | Found | |
|---|---|---|---|---|---|---|
| | | | C | H | C | H |
| benzodioxan-COOC$_3$H$_7$ | 823 | 290 | 64.85 | 6.35 | 65.00 | 6.4 |
| benzodioxan-COO-iso-C$_4$H$_9$ | 607 | 214 | 66.09 | 6.83 | 66.04 | 6.7 |
| benzodioxan-COOC$_4$H$_9$ | 521 | 184 | 66.09 | 6.83 | 66.31 | 6.8 |
| benzodioxan-COO-iso-C$_5$H$_{11}$ | 478 | 169 | 67.18 | 7.25 | 67.04 | 7.3 |
| benzodioxan-COOC$_5$H$_{11}$ | 428 | 151 | 67.18 | 7.25 | 67.07 | 7.3 |
| CH$_3$CH=CHCH=CHCOOC$_4$H$_9$ (Std) | 283 | 100 | - | - | - | - |
| benzodioxan-COOC$_2$H$_5$ | 214 | 76 | - | - | - | - |
| benzodioxan-COOC$_6$H$_{13}$ | 148 | 52 | 68.16 | 7.63 | 68.34 | 7.8 |

[a] Results over a 9-day test period

We claim:
1. Propyl 1,4-benzodioxan-2-carboxylate.

* * * * *